July 10, 1945.  G. H. HUFFERD  2,380,240
SEPARABLE FASTENER
Filed Feb. 13, 1942  3 Sheets-Sheet 1
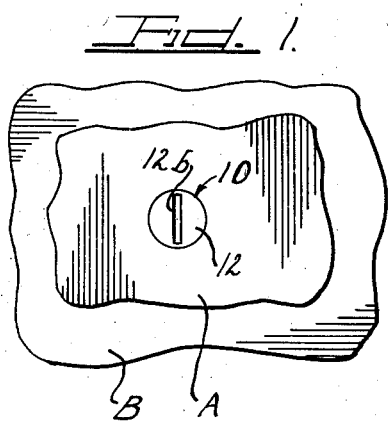
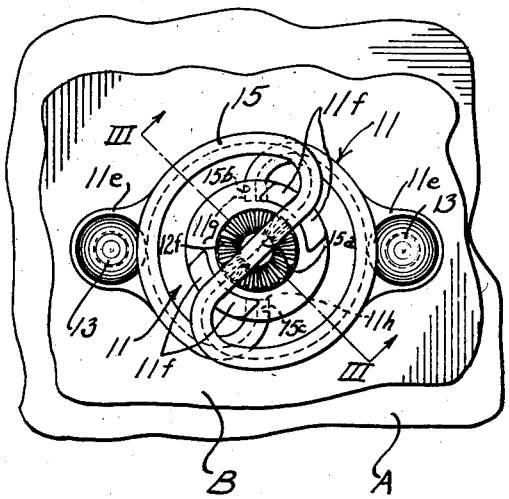
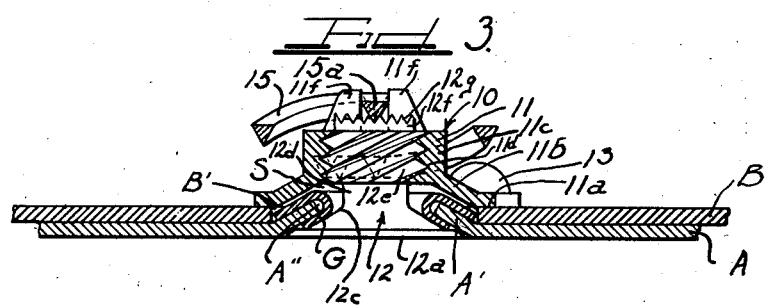
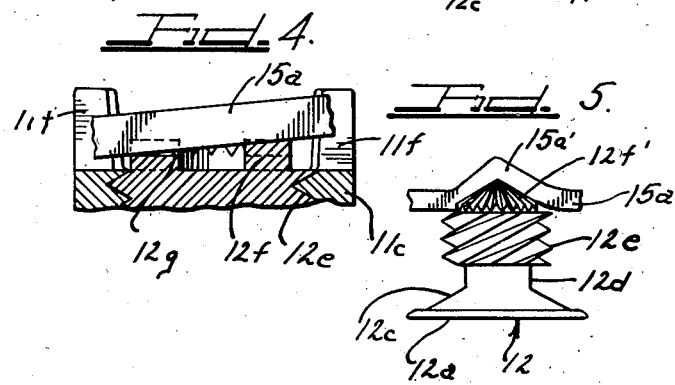
Inventor
GEORGE H. HUFFERD

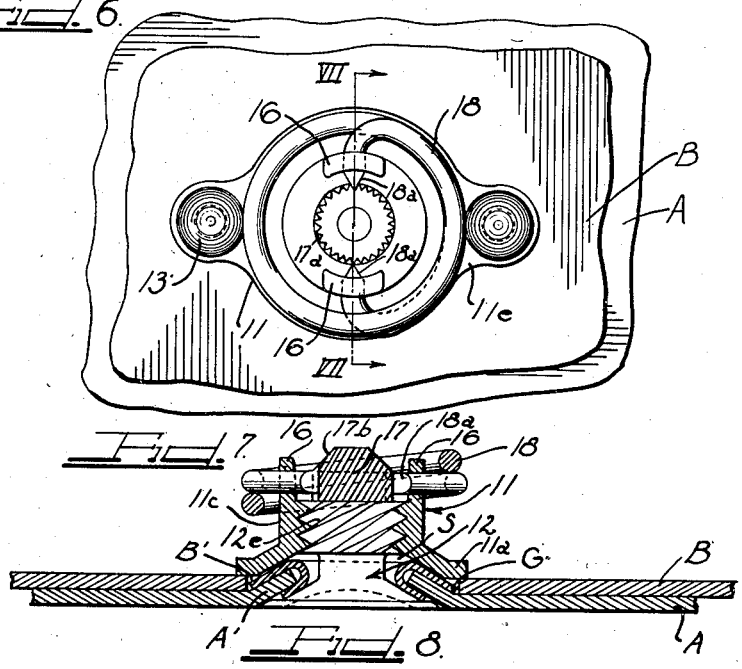
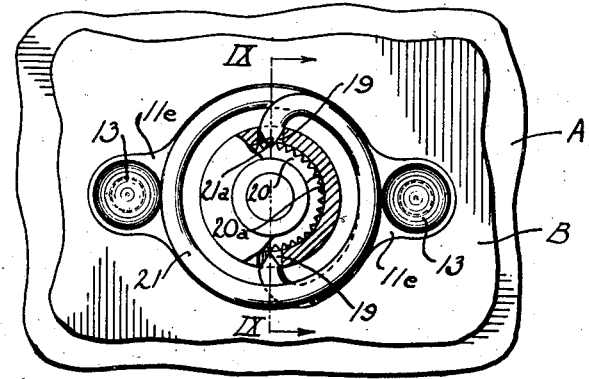
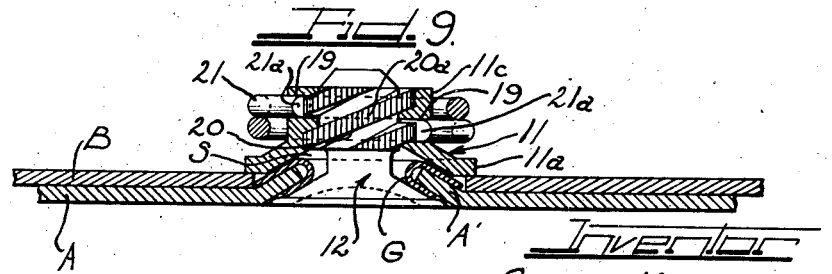

July 10, 1945. G. H. HUFFERD 2,380,240
SEPARABLE FASTENER
Filed Feb. 13, 1942 3 Sheets-Sheet 3
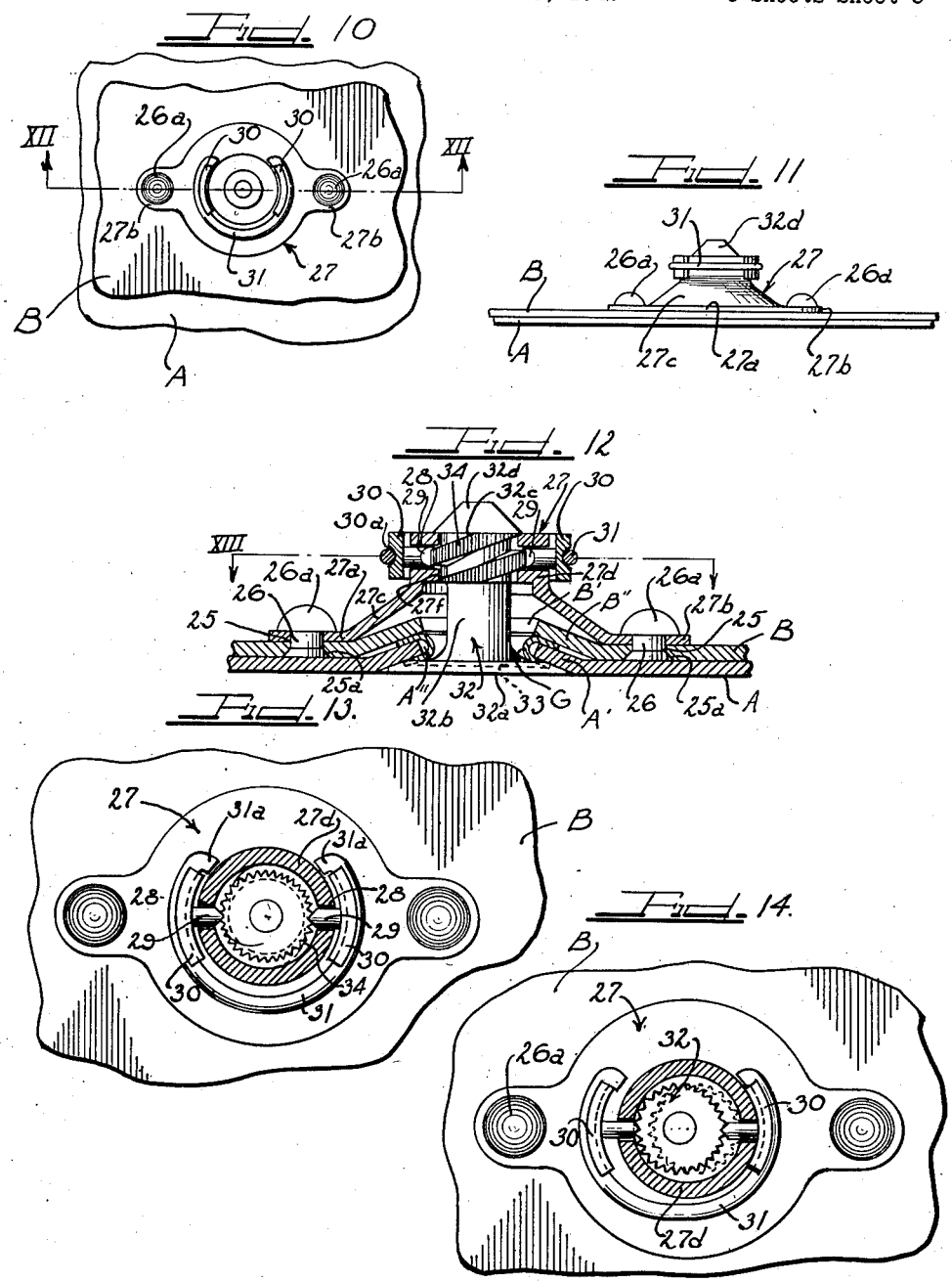
Inventor
GEORGE H. HUFFERD Patented July 10, 1945

2,380,240

UNITED STATES PATENT OFFICE 2,380,240

SEPARABLE FASTENER

George H. Hufferd, Grosse Pointe, Mich., assignor to Houdaille-Hershey Corporation, Detroit, Mich., a corporation of Michigan Application February 13, 1942, Serial No. 430,733

9 Claims. (Cl. 151—11)

This invention relates to separable fasteners which are universally useful in detachably connecting parts and are especially adapted for securing cowling, inspection plates, panels and the like in position on an airplane.

More specifically the invention relates to fasteners composed of internally threaded receptacles, externally threaded studs fitting the receptacles in screw thread relation, and spring-urged locking means on the receptacles registering with serrations on the stud to lock the parts against unauthorized separation without, however, interfering with authorized separation of the parts.

Spring locked cowling fasteners have heretofore been made to fit individual installations and have had to be furnished in a multiplicity of lengths to accommodate different gauges or thicknesses of the parts to be fastened together. Thus the fastening together of a pair of relatively thick plates heretofore required a longer fastener stud than was required for a pair of thinner plates, and the longer stud could not be used to pull the thinner plates into tight fastened position.

In accordance with this invention, however, separable fasteners of one size are now provided for use on plates or parts to be fastened together which have widely different gauges or thicknesses. The invention therefore obviates the necessity of providing a whole series of fastener sizes since one size will accommodate a wide field of usage.

The fasteners of this invention include a receptacle attachable to the inner face of an apertured part such as an airplane cowling support body, fuselage, or wing structure, and a stud adapted to be rotatably mounted in the aperture of an outer part such as a cowling piece. The receptacle is internally threaded to receive external threads on the stud. The receptacle carries spring-urged locking means engageable with a serrated surface on the stud to prevent unauthorized separation of the parts and to firmly hold the stud against rotation which might otherwise be caused by vibration of the parts.

Since the stud and receptacle are in screw thread relation, thin plates can be tightly pulled together with the same sized fastener as is used for securing thick plates by merely threading the stud further into the receptacle.

It is, then, an object of the invention to provide a universal separable fastener which is useful for detachably connecting thin plates as well as thick plates.

A further object of the invention is to provide an airplane cowling fastener of a standard size useful throughout a wide range of cowling gauges.

Another object of the invention is to provide a screw thread type of fastener with spring type locking means preventing unauthorized separation of the fastener parts.

A specific object of the invention is to provide an internally threaded fastener receptacle with spring urged locking teeth adapted to hold a locking stud threaded into the receptacle against unauthorized rotation while permitting authorized rotation.

A further object of the invention is to provide a locking stud for fasteners with a serrated surface adapted to receive a locking means.

A still further object of the invention is to provide a threaded fastener stud with serrations on the threads.

Other and further objects of the invention will be apparent to those skilled in the art from the following detailed descriptions of the annexed sheets of drawings which, by way of preferred examples, show several embodiments of the invention.

On the drawings:

Figure 1 is a top plan or outside plan view of a pair of plates held together by a fastener according to this invention and illustrating the head of the fastener in an aperture of the outer plate.

Figure 2 is a bottom plan or inside face view of the pair of plates shown in Figure 1 and illustrating the receptacle of the fastener according to this invention mounted on the inner plate.

Figure 3 is a vertical cross-sectional view, with parts in elevation, along the line III—III of Figure 2.

Figure 4 is an enlarged fragmentary side elevational view, with parts in vertical cross section, illustrating the cooperation between the locking spring of the fastener receptacle and the serrated end of the fastener stud.

Figure 5 is a fragmentary side elevational view of another form of fastener stud and another form of locking spring cooperating therewith.

Figure 6 is a view similar to Figure 2 but illustrating another form of fastener in accordance with this invention.

Figure 7 is a vertical cross-sectional view, with parts in elevation, taken along the line VII-VII of Figure 6.

Figure 8 is a view similar to Figures 2 and 6 illustrating still another form of fastener and with parts of the fastener receptacle broken away and shown in horizontal cross-section.

Figure 9 is a vertical cross-sectional view taken along the line IX—IX of Figure 8.

Figure 10 is a view similar to Figures 2 and 6 but illustrating still another form of fastener according to this invention.

Figure 11 is a side elevational view of the fastener and plates shown in Figure 10.

Figure 12 is a vertical cross-sectional view, with parts in elevation, taken along the line XII—XII of Figure 10.

Figure 13 is a horizontal cross-sectional view, with parts in elevation, along the line XIII—XIII of Figure 12.

Figure 14 is an enlarged view similar to Figure 10 but illustrating the manner in which the stud can be shifted in the receptacle to accommodate misalignment of plate apertures.

As shown on the drawings:

In Figures 1 to 3 inclusive the reference numeral 10 indicates generally a fastener according to this invention as detachably connecting a pair of apertured metal plates including an outer plate A such as an airplane cowling piece and an inner plate B such as an airplane body part or cowling mounting piece.

The plate A is embossed or dimpled as at A' and the embossed portion A' defines a circular aperture A''. A metal grommet G is seated in the aperture A'' and embraces the embossed portion A'.

The plate B has a circular aperture B' therethrough of large enough diameter to receive the embossed portion A' and the grommet G on the plate A.

The fastener 10 is composed of a receptacle 11 mounted on the inner face of the plate B to straddle the aperture B' therein, and a locking stud 12 rotatably mounted in the grommet G carried by the plate A.

The receptacle 11, as best shown in Figure 3, has a flat base or bottom adapted to rest on the plate B around the aperture B' thereof. A frustoconical or sloping wall 11b extends upwardly from the base 11a over the aperture B' to provide a socket or chamber S adapted to freely receive the grommet G. The sloping wall portion 11b terminates at its inner upper end in an upstanding cylindrical collar portion 11c which is internally threaded as at 11d.

The receptacle 11 has apertured ears 11e as best shown in Figure 2, extending laterally outward from the base 11a thereof. Rivets 13 extend through the ear apertures and through apertures in the plate B (not shown) to secure the receptacle on the plate. The rivets 13 are headed over the ears as shown in Figure 2 and also have enlarged ends seated in counterbores of the plate apertures for fixedly retaining the receptacle on the plate.

The top end of the cylindrical collar portion 11c of the receptacle 11 has two pairs of upwardly projecting spaced cooperating lugs 11f thereon preferably positioned on quadrants of the collar between vertical planes passing through the longitudinal and transverse centers of the receptacle. Each pair of lugs 11f define an open topped recess for holding the locking leg 15a of a spring 15 across the open top of the collar portion. The spring 15 is of triangular cross section with a pointed apex in the locking leg portion 15a thereof extending downward as best shown in Figure 3.

As best shown in Figure 2, one end of the spring, such as the end 15b, is seated in a blind hole 11g formed in the collar portion 11c of the receptacle. The spring 15 is then coiled around the outside of the receptacle to pass between the lugs 11f on the side of the receptacle opposite the hole 11g. The spring then is directed between the other pair of lugs 11f so that the leg portion 15a of the spring will be disposed over the collar portion at the axial center thereof. The spring, after passing between the second pair of lugs 11f is then coiled around the opposite side of the receptacle and has the other end 15c thereof seated in a second hole 11h formed in the receptacle collar.

The spring 15 thus has a somewhat S-shape with opposite coil portions for each end of the spring leg 15a thereof. The ends of the coil portions are adapted to be readily snapped into holes or other recesses formed in the side wall of the receptacle.

As shown in Figure 3 the stud 12 has an enlarged head portion 12a adapted to fit into the dimple defined by the embossed portion A' of the plate A so that the head of the stud will be flush with the outer face of the plate when the stud is in fully seated position. The stud head 12a has a screwdriver slot 12b therein as best shown in Figure 1.

A conical portion 12c is formed between the stud head 12a and a cylindrical shank portion 12d. This cylindrical shank portion is adapted to fit freely through the aperture of the grommet G and has an enlarged threaded portion 12e adapted to be threaded into the collar portion 11c of the receptacle as shown. The threads of the threaded portion 12e have an outside diameter greater than the inside diameter of the grommet so that the stud will be held in loosely assembled relation relative to the plate A.

For assembly purposes the grommet G can be initially furnished in loose assembled relation around the shank 12d of the stud and can then be bent to embrace the embossed portion A' of the plate when the fastener is being assembled onto the plate.

The end of the shank above the threaded portion 12e, as best shown in Figure 4, has a projecting annular collar 12f integral therewith. The upper face of the collar is serrated as at 12g. As shown in Figure 2, the serrations 12g extend radially around the collar. The spring leg 15a is adapted to have the pointed apex thereof fit between the teeth of the serrated surface for locking the stud against rotation. As shown in Figure 4, the serrations are arranged so that no two teeth thereof are in direct alignment and thus, when one portion of the spring leg 15a fits into a groove or space between two teeth the portion of the leg above the opposite side of the collar will ride on top of a tooth. In this manner the spring leg will alternately cock between opposed grooves in the serrated surface and, as it rides out of one groove, it will immediately fall into another groove on the opposite side of the stud. A mere minute portion of a turn of the stud will therefore cause a clicking of the spring lock out of one groove and into another. As a result, the stud can be locked in any position.

As also shown in Figure 4, the spring leg 15a is adapted to be pushed upwardly relative to the lugs 11f if it is necessary to screw the stud into the receptacle so that a portion of the threaded end thereof will extend past the flush relation with the top end of the collar. Likewise the spring leg 15a can drop downwardly to the bottom of the recesses between the lugs 11f for latching engagement with the serrated stud surface even though the stud is not fully threaded into the receptacle. As a result, therefore, the stud may be locked in any one of a number of different positions and may be used for detachably connecting apertured plates of many different thicknesses.

The screw thread relation between the stud and receptacle makes possible a definite pulling together of the outer plate onto the inner plate to tightly force the cowling or other detachable part into position on its mounting.

The threads in the receptacle and on the stud are shown to be in U. S. form, although Buttress threads, Acme threads, Whitworth threads, or the like can be used.

In the modification shown in Figure 5 the stud 12 has the same head 12a, conical portion 12c, shank 12d and threaded portion 12e defined above, but the end of the stud above the threaded portion 12e is provided with a conical serrated head 12f' instead of the annular portion 12f. The spring leg 15a has a kinked section 15a' adapted to fit over the conical head 12f' and seat on the serrated surface. Thus one leg of the kinked portion 12a' can ride on top of a tooth of the serrated surface 12f' while the other leg of the kinked portion can fit between the teeth on the opposite side of the head to lock the stud against rotation. The same result described in connection with Figures 1 to 4 will obtain.

In the second form of the invention, shown in Figures 6 and 7, parts identical with parts described in Figures 1 to 4 have been marked with the same reference numerals and characters. Instead of providing the pairs of lugs 11f on the receptacle collar 11c, however, a single pair of apertured lugs 16 are provided. These lugs 16 are positioned adjacent the transverse axis of the receptacle.

Instead of the serrated collar 12f or the serrated conical head 12f' described above, the stud 12 is equipped with a cylindrical end portion 17 which is serrated around the periphery thereof as at 17a. The serrations extend vertically from the top or inner end of the threaded portion 12e to a tapered portion 17b on the inner end of the stud.

A spring 18 of circular cross section is coiled around the collar portion 11c of the receptacle and has the ends thereof extending through the apertures in the lugs 16. The terminals of the spring are chisel-pointed as at 18a to provide teeth adapted to seat in the grooves of the serrated surface 17a. The serrations can be arranged so that no two teeth will have the apexes aligned on diametrically opposed sides of the stud whereupon one chisel end of the spring can fit between the teeth on one side of the stud while the other chisel end of the spring is riding on the apex of a serration as shown in Figure 6.

The stud is threaded into the receptacle as described in connection with Figures 1 to 4 and the spring terminals will ratchet over the serrated surface until the stud is driven home whereupon unauthorized rotation of the stud will be prevented by the cooperating locking relationship between the spring terminals and the serrated stud surface.

In the third form of the invention shown in Figures 8 and 9, parts identical with parts described in Figures 1 to 4 have also been marked with the same reference characters and numerals.

As shown in Figures 8 and 9 the internally threaded collar portion 11c of the receptacle 11 has a pair of holes 19 drilled through the side walls on opposite sides of the collar portion at different levels as best shown in Figure 9. The interior of the collar portion 11c has a square internal thread for receiving a square external thread 20 on the stud 12. The outer surface of the thread 20 is serrated as at 20a to provide alternate vertical teeth and grooves.

A spring 21 is coiled around the collar portion 11c and has the terminal ends thereof extending into the apertures 19 and provided with chisel-pointed ends 21a to act against the serrated surface 20a of the stud thread. The spring 21 can be of any desired cross section such as a circular cross section and can be wrapped around the collar portion 11c of the receptacle for as many turns as desired. The spring will be stressed outwardly by the serrated surface and the chisel ends thereof will tend to spring into the grooves between the teeth of the serrated surface for firmly locking the stud in position.

In the forms of the invention described in Figures 1 to 9 the embossed portion A' of the outer plate carries the grommet G into the socket portion S of the receptacle and proper alignment between the stud and receptacle is automatically produced. While the grommet can fit rather freely in the socket chamber S and also in the aperture B' of the plate B, the threaded relation between the stud and receptacle will serve to pull the outer plate A into tight face to face engagement with the inner plate B. Any shear loads between the plates A and B will be counteracted by abutment between the grommet G and the tapered surface 11b of the receptacle or by the edge of the grommet and the aperture-defining wall of the aperture B' in the plate B.

The inside threads of the receptacle can be made somewhat larger than the outside threads of the stud to accommodate misalignment of the apertures and still permit threading together of the parts. In all forms of the invention the stud is locked in position against unauthorized rotation in any one of a large number of different positions so that the same sized fastener is useful with plates of many different thicknesses.

In the fourth form of the invention, disclosed in Figures 10 to 14, the outer plate A is embossed or dimpled as at A' and has the aperture A'' through the inner end of the embossed portion receiving the grommet G therearound as described hereinabove. However, the inner plate B is also embossed or dimpled as at B'' to overlie the embossed portion A' of the plate A and the grommet G. As best shown in Figure 12, the aperture B' of the plate B is above the grommet in alignment with the aperture A'' of the plate A. The embossed portions A' and B'' of the plates A and B are in superimposed relation with one leg of the grommet therebetween. The plate B has a pair of small apertures 25 therethrough on each side of the aperture B' thereof and these apertures 25 are countersunk or beveled at the outer face of the plate B as indicated at 25a. Rivets 26 have heads seated in the countersunk portions 25a and shanks extending through the apertures 25 above the inner face of the plate B.

This rivet structure is identical with the rivet structure 13 described hereinabove but not heretofore illustrated.

The fastener includes a receptacle 27 having a flat annular base 27a seatable on the flat inner face of the plate B around the embossed portion B" thereof. Integral apertured ear portions 27b extend laterally from diametrically opposed sides of the base 27a and receive the rivet shanks therethrough. These rivet shanks can then be headed as at 26a over the ears 27b to fixedly retain the receptacle on the plate B.

The receptacle has a conical wall portion 27c extending upwardly from the inner end of the flat base portion 27a over the embossed portion B" of the plate B. An upstanding cylindrical portion 27d is provided on top of the wall portion 27c. This cylindrical portion is provided with an internal square thread 27f (Fig. 12).

The side wall of the cylindrical portion 27d has holes 28 through diametrically opposed portions thereof. Locking pins 29 having chisel-pointed ends are freely seatable in the holes 28. These locking pins 29 are carried intermediate the ends of arcuate blocks 30 fitting partially around the cylindrical portion 27d and having grooves 30a in their outer faces.

A spring wire 31 is disposed around the collar portion 27d and has portions thereof seated in the grooves 30a of the blocks 30. The spring 31 has the ends thereof bent inwardly as at 31a as best shown in Figure 13, over the ends of the blocks 30. The spring wire can readily be snapped into position partially around the collar portion 27d to envelop the blocks 30 and be seated in the grooves of the blocks. This spring will serve to resiliently urge the locking pins 29 toward the interior of the collar portion 27d.

The holes 28 in which the pins 29 are seated are aligned with the thread in the interior of the collar portion 27d.

The locking stud 32 of the fastener has a head portion 32a adapted to fit into the dimple provided by the embossment A' on the plate A for abutting the embossed portion of the plate. This head has a groove 33 therearound adapted to receive one leg of the grommet G. The grommet G can be furnished by the manufacturer in assembled relation around the stud and the stud is freely retained in the plate by merely peening over the grommet to embrace the embossed portion A' of the plate.

The stud 32 has a cylindrical shank 32b extending freely through the apertures of the plate and through the housing provided by the tapered wall 27c of the receptacle into the collar portion of the receptacle. This portion of the shank 32b extending into the collar portion of the receptacle has a square thread 32c adapted to freely seat in the internal thread of the collar. The thread 32c has serrations 34 around the periphery thereof and this serrated surface is acted on by the chisel-pointed ends of the locking pins 29.

The very end of the stud shank may be tapered as at 32d.

The stud, when threaded into the receptacle, will pull the plates A and B into tight engagement and, when the desired engagement has been obtained, the stud is locked against reverse rotation by the pins 29 which have their pointed ends seated in the grooves provided by the serrated screw threads on the stud.

As shown in Figure 14 the stud can shift sideways in the collar portion 27d of the receptacle 27 since the internal threads of the collar portion are somewhat oversize. As a result, a somewhat loose fit in a plane transverse to the axis of the stud is provided and the stud can shift, or even be slightly cocked relative to the receptacle, without becoming disengaged from the receptacle threads. This play or looseness in the parts permits the joining together of plates even when the apertures therein are out of line, or when the receptacle is not properly aligned with the aperture on the inner plate. Such misalignment will not in any way cause damaging of the fastener parts. In all forms of the invention a ratchet engagement between the locking stud and the fastener receptacle is obtained. This ratchet or pawl and tooth engagement successfully holds the parts against unauthorized separation but, at the same time, does not interfere with authorized separation of the parts.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fastener for joining a plurality of apertured parts which comprises a receptacle having a base adapted to be mounted around the aperture of one of said parts, an internally threaded collar carried by said base in alignment with the aperture in said parts, a stud having a shank portion, an enlarged head portion and an enlarged threaded portion in spaced relation from the head portion, said shank portion of the stud fitting freely in the aperture of said other part and said head and threaded portion being larger than said aperture to hold the stud in said other part, said threaded portion on said stud engageable in screw thread relation in the internally threaded collar portion of the receptacle, a spring member carried by said receptacle having a portion thereof engageable with a portion of said stud, and said stud portion having a serrated surface cooperating with said spring portion to prevent unauthorized relative rotation between the receptacle and stud.

2. A fastener comprising an internally threaded open ended receptacle, a spring member mounted on said receptacle having a leg extending across an open end thereof, an externally threaded stud adapted to be threaded into said receptacle, a plurality of alternate teeth and grooves on the end of said stud engageable with said spring leg, and said teeth being misaligned so that one portion of the spring leg will be disposed between a pair of teeth while another portion of the spring leg is on top of a tooth.

3. A fastener comprising an internally threaded open ended receptacle having a pair of upstanding opposed apertured lugs, a spring coiled around said receptacle having pointed ends extending through the apertures of said lugs, an externally threaded stud adapted to be screwed into said receptacle, and a longitudinally extending serrated portion on said stud adapted to be engaged by said spring ends for resisting relative rotation between the stud and receptacle.

4. A fastener comprising a receptacle having a flat base, a conical portion inwardly of said base and an upstanding cylindrical collar portion on the inner end of the conical portion, an internal square thread in said collar portion, a plurality of openings through the side wall of the collar portion communicating with said internal thread, locking pins extending through said openings, a spring disposed around the collar portion urging said locking pins into the internal thread, and a locking stud having an exterior square thread with longitudinally extending serrations adapted to be engaged by said locking pins.

5. A fastener receptacle comprising a metal member having a flat annular base, a sloping wall portion extending inwardly from said base, and an upstanding internally threaded portion on the sloping wall portion, a spring coiled around said upstanding portion and lugs on said upstanding portion guiding a leg of said spring across the open end of the upstanding portion.

6. A fastener receptacle comprising a cup-shaped metal member having an internally threaded portion and a flat base portion in axially spaced relation from said internally threaded portion, and a spring coiled around said internally threaded portion having the terminal ends thereof extending into the internally threaded portion to provide locking means therein.

7. A fastener receptacle comprising a cup-shaped metal member having a flat annular base, an inwardly sloping wall portion, and an upstanding cylindrical internally threaded portion on the inner end of said sloping portion, and a spring coiled around said upstanding cylindrical portion having pointed terminal ends extending through the wall of the cylindrical portion into the internal thread thereof.

8. A fastener receptacle comprising an internally threaded female member having a plurality of radial openings through the side wall thereof communicating with the internal thread, a plurality of block members disposed around the outer face of the internally threaded member, a pin having a pointed end extending from each block member through said radial opening into the internal thread of the member, said block members having externally grooved faces, and a spring enveloping said block members and having portions seated in said grooves to hold the block members on the female member.

9. A fastener adapted for detachably connecting a plurality of apertured parts which comprises a receptacle having a base adapted to be mounted on one of the parts around the aperture thereof, mounting means on said base adapted to receive rivets therethrough for fixedly securing the receptacle on said part, said receptacle having a recess defining portion adapted to receive a plate part therein, an internally threaded end portion on said receptacle, a stud adapted to project through the apertures of said parts having a head for thrusting against the outermost part and a threaded portion for threaded engagement with said threaded end of the receptacle, serrations on said stud, and spring urged means carried by said receptacle adapted to engage said serrations for holding the stud against unauthorized rotation.

GEORGE H. HUFFERD.